United States Patent [19]

Matney

[11] Patent Number: 4,811,083
[45] Date of Patent: Mar. 7, 1989

[54] APPARATUS FOR DISPLAYING THE PHASE AND AMPLITUDE OF A CHROMINANCE SIGNAL

[75] Inventor: Earl G. Matney, Newberg, Oreg.
[73] Assignee: Tektronix, Inc., Beaverton, Oreg.
[21] Appl. No.: 781,323
[22] Filed: Sep. 30, 1985

Related U.S. Application Data

[63] Continuation of Ser. No. 504,569, Jun. 15, 1983, abandoned.

[51] Int. Cl.[4] .............................................. H04N 17/02
[52] U.S. Cl. ..................................... 358/10; 324/88; 358/242
[58] Field of Search ................. 358/10, 220, 242, 243; 324/86, 88; 315/384

[56] References Cited

U.S. PATENT DOCUMENTS

| | | | |
|---|---|---|---|
| 2,363,810 | 11/1944 | Schrader et al. | 315/384 |
| 3,962,723 | 6/1976 | Srivastava | 358/27 |
| 3,967,313 | 6/1976 | Miyamoto | 358/27 |
| 4,092,667 | 5/1978 | Akazawa et al. | 358/26 |
| 4,127,796 | 11/1978 | Henderson | 358/220 |
| 4,198,661 | 4/1980 | Gatten et al. | 358/243 |
| 4,253,108 | 2/1981 | Engel | 358/26 |
| 4,338,623 | 7/1982 | Asmus et al. | 358/220 |

FOREIGN PATENT DOCUMENTS

| | | | |
|---|---|---|---|
| 2844112 | 4/1979 | Fed. Rep. of Germany | 358/220 |
| 402181 | 11/1933 | United Kingdom | 358/220 |

*Primary Examiner*—John W. Shepperd
*Attorney, Agent, or Firm*—Francis I. Gray; John Smith-Hill

[57] ABSTRACT

Apparatus for displaying in polar coordinates the relative phase and amplitude of a chrominance signal comprises a display device, such as a CRT display device, having a circuit for adjusting the brightness of the light dot. The apparatus also comprises a circuit for generating a blanking signal and applying it to the adjustment circuit in the event that the amplitude of the chrominance signal is below a predetermined value.

2 Claims, 1 Drawing Sheet

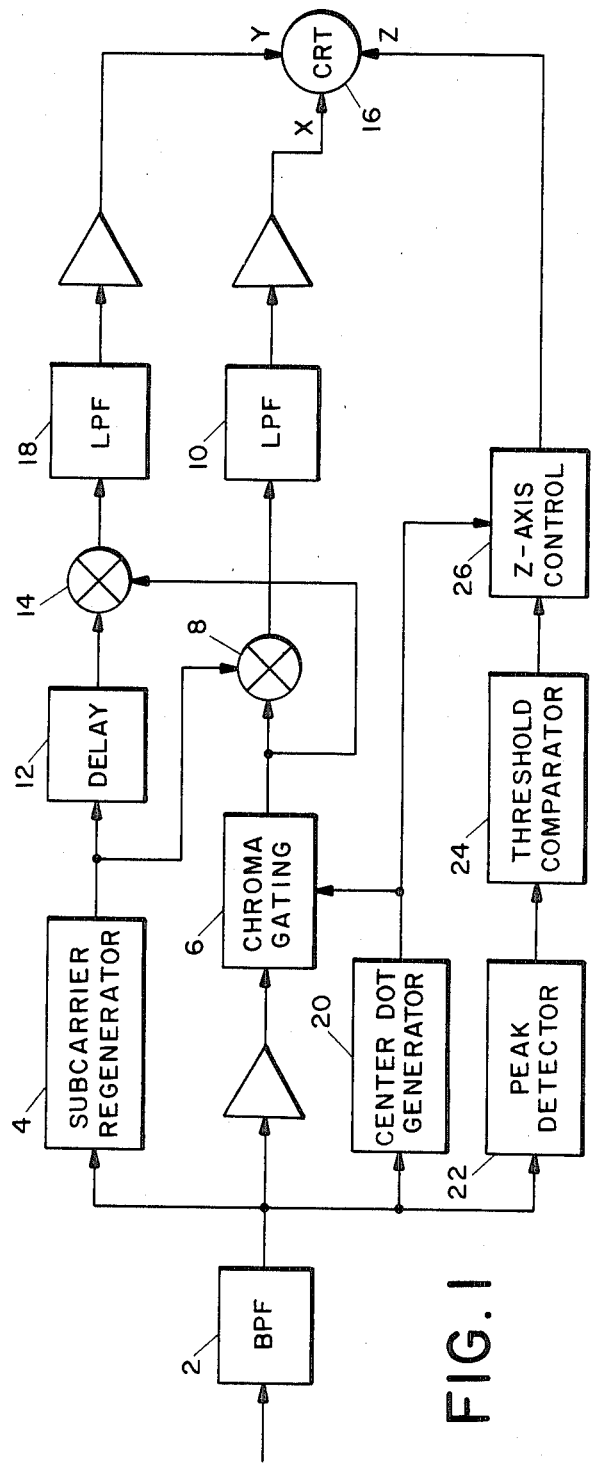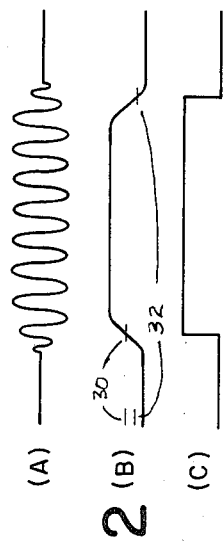
FIG. 1
FIG. 2

APPARATUS FOR DISPLAYING THE PHASE AND AMPLITUDE OF A CHROMINANCE SIGNAL

This is a continuation of application Ser. No. 504,569 filed June 15, 1983 and now abandoned.

This is a continuation of application Ser. No. 504,569 filed June 15, 1983 and now abandoned.

This invention relates to apparatus for displaying the phase and amplitude of a chrominance signal.

BACKGROUND OF THE INVENTION

It is conventional to use a vectorscope including a cathode ray tube (CRT) to display in polar coordinates the phase and amplitude of a chrominance signal, the amplitude of the signal being represented by the radial coordinate and the phase relative to burst being represented by the angular coordinate. A consequence of this display format is that the light dot of the CRT remains at the same position on the CRT screen if the amplitude of the chrominance signal is zero, or below some small value, regardless of the value of the relative phase. Consequently, when the duty cycle of the display is low, or the signal is predominantly of low amplitude, the center spot is by far the brightest area of the display. This leads to problems in use, such as poor viewability and difficulty in identifying the precise location of the center dot owing to haloing, and also gives rise to the danger that the phosphor of the CRT might be damaged.

SUMMARY OF THE INVENTION

According to the present invention there is provided apparatus for displaying in polar coordinates the relative phase and amplitude of a chrominance signal, comprising a display device having a display surface, means for generating a light dot on the display surface, means for deflecting the light dot in two predetermined, mutually perpendicular directions over the display surface in such manner that, regardless of relative phase, the light dot remains at the same position if the amplitude of the chrominance signal has a predetermined value or lies within a predetermined range of values, and means for adjusting the intensity of the light dot, the apparatus also comprising means for generating a blanking signal and applying it to the adjusting means of the display device in the event that the amplitude of the chrominance signal has said predetermined value or lies within said predetermined range of values.

BRIEF DESCRIPTION OF THE DRAWINGS

For a better understanding of the invention, and to show how the same may be carried into effect, reference will now be made, by way of example, to the accompanying drawing, in which:

FIG. 1 is a blcok diagram of a vectorscope, and

FIG. 2 illustrates waveforms obtained at various points of FIG. 1.

DETAILED DESCRIPTION

The vectorscope illustrated in FIG. 1 comprises a bandpass filter 2 which is tuned to the frequency of the color subcarrier and thus selects the chrominance frequency from an input video signal. The output of the bandpass filter 2 is applied in conventional manner to a subcarrier regenerator 4 which locks to the color burst of the video signal and generates a continuous wave signal synchronized with burst. The chrominance signal is in addition applied through a chroma gating circuit 6 to a demodulator 8 which receives the regenerated burst signal and provides at its output the demodulated chrominance signal. The demodulated chrominance signal is passed through a low pass filter 10 to the horizontal deflection amplifier of a CRT 16. The output of the subcarrier regenerator 4 is delayed by 90° (one-quarter period of the burst signal) by a delay line 12 and is applied to a second demodulator 14 which also receives the output signal of the chroma gating circuit 6. The output signal of the demodulator 14 represents the phase of the chrominance signal relative to burst, and is applied to the vertical deflection amplifier of the CRT 16 through a low pass filter 18.

The chroma gating circuit 6 operates under control of a center dot generator circuit 20 to provide a center dot in the event that the input signal is a continuous wave signal, i.e., one in which there is no interval during which the amplitude of the chrominance signal is zero. The center dot is provided by repeatedly grounding the output of the chroma gating circuit 6 independently of the amplitude of the input signal. The timing for the grounding operation is established by the circuit 20.

The output of the filter 2 is also applied to a peak detector 22 which provides at its output a signal which follows the envelope of the input signal. The peak detector is designed to respond rapidly to increasing amplitude of chrominance and slowly to decreasing amplitude of chrominance. The envelope signal provided by the peak detector 22 is applied to the threshold comparator 24. The output signal of the threshold comparator goes high when the envelope signal increases through a first threshold level 30 (FIG. 2) and goes low when the envelope signal fall below a second, lower threshold level 32. Thus, the comparator 24 introduces hysteresis into the output of the peak detector.

The output of the threshold comparator 24 is applied to a Z-axis control circuit 26, which controls the beam current of the CRT 16. Beam current is provided to the CRT so long as the output signal of the threshold comparator is high. The Z-axis control circuit also responds to the center dot generator circuit 20 to insure that the center dot is not completely blanked. Thus, the circuit 20 repeatedly overrides the output of the threshold comparator 24 and thereby insures that the CRT display includes a center dot, but the dot is much fainter than it would be if the peak detector and threshold comparator were omitted.

The rapid response of the peak detector to increasing amplitude of chrominance, together with the delay introduced by the low pass filters, insures that unblanking takes place in time to view vector transitions.

FIG. 2 illustrates in simplified form the manner of operation of the peak detector and threshold comparator. The waveform A illustrated in FIG. 2 represents the input to the peak detector during the back porch of the horizontal synchronizing interval of a composite video signal, and thus includes the color burst. The waveform B represents the envelope signal provided at the output of the peak detector, while the waveform C represents the output of the threshold comparator. The first and second threshold levels 30 and 32 are shown in FIG. 2 against the waveform b.

It will be appreciated that the invention is not restricted to the particular circuit which has been described and illustrated, since variations may be made therein without departing from the scope of the invention as defined in the appended claims, and equivalents thereof.

I claim:

1. An improved apparatus for displaying in polar coordinates the relative phase and amplitude of a chrominance signal, the apparatus having a display device with a display surface, means for generating a light dot in two predetermined, mutually perpendicular directions over the display surface in such manner that, regardless of relative phase, the light dot remains at the same position if the amplitude of the chrominance signal is less than a predetermined value, and means for adjusting the intensity of the light dot, the improvement comprising:

a peak detector for generating a signal representing the envelope of the chrominance signal; and a threshold comparator for receiving the envelope signal and providing a blanking signal to the adjusting means of the display device when the amplitude of the chrominance signal is less than said predetermined value.

2. An improved apparatus according to claim 1, wherein the display device includes a center dot generator circuit which is operative to override repeatedly the blanking signal so as to insure that the light dot is not fully blanked when the chrominance signal is less than said predetermined value.

* * * * *